(12) United States Patent
Lavery et al.

(10) Patent No.: US 6,267,806 B1
(45) Date of Patent: *Jul. 31, 2001

(54) DYE COMPOSITIONS

(75) Inventors: Aidan Joseph Lavery; John Edward Presgrave, both of Manchester (GB)

(73) Assignee: Zeneca Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,376

(22) Filed: Dec. 4, 1998

(30) Foreign Application Priority Data

Dec. 19, 1997 (GB) .................................................. 9726777

(51) Int. Cl.⁷ .................................................. C09D 11/02
(52) U.S. Cl. .................. 106/31.48; 106/31.5; 106/31.52
(58) Field of Search .............................. 106/31.48, 31.5, 106/31.52

(56) References Cited

U.S. PATENT DOCUMENTS

| | | | | |
|---|---|---|---|---|
| 4,601,756 | * | 7/1986 | Chiba et al. ....................... | 106/31.27 |
| 4,605,442 | * | 8/1986 | Kawashita et al. ................ | 106/31.48 |
| 5,017,227 | * | 5/1991 | Koike et al. ....................... | 106/31.27 |
| 5,605,566 | * | 2/1997 | Yui et al. .......................... | 106/31.32 |
| 5,614,007 | * | 3/1997 | Kurabayashi et al. ............ | 106/31.27 |
| 5,622,550 | * | 4/1997 | Konishi et al. .................... | 106/31.48 |

FOREIGN PATENT DOCUMENTS

| 0771860 | 5/1997 | (EP) . |
|---|---|---|
| 9844053 | 10/1998 | (WO) . |

* cited by examiner

*Primary Examiner*—Helene Klemanski
(74) *Attorney, Agent, or Firm*—Rothwell, Figg, Ernst & Manbeck

(57) ABSTRACT

Disclosed are compositions useful in inks suitable for ink jet printing. The compositions comprising a black dye of specified formula and a dye of the formula (A) or salt thereof:

Formula (A)

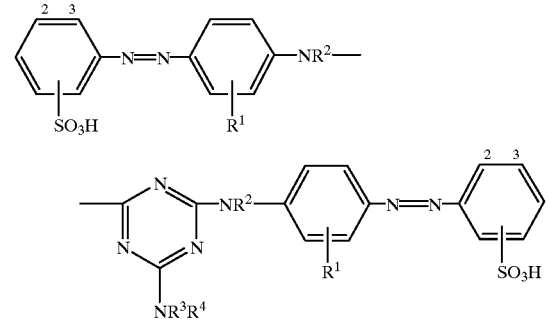

wherein:

$R^1$ is $C_{1-4}$-alkoxy or $C_{1-4}$-alkyl;

$R^2$ is H or $C_{1-4}$-alkyl; and $R^3$ and $R^4$ are each independently H, $C_{1-4}$-alkyl or $C_{1-4}$-hydroxyalkyl;

20 Claims, No Drawings

DYE COMPOSITIONS

This invention relates to a composition comprising two or more dyes, to inks containing such compositions and to processes using said inks in printing and imaging technologies, especially ink jet printing.

Ink jet printing is a non-impact printing technique which involves ejecting, thermally or by action of an oscillating piezo crystal, droplets of ink continuously or on demand from a fine nozzle directly onto a substrate. The inks used in an ink jet printer are required to meet a number of criteria. For example they desirably provide sharp, non-feathered images which have good waterfastness, lighffastness and optical density. Furthermore, the inks are required to dry quickly when applied to a substrate, however, they must not dry or crust over in the ink jet head as this can result in clogging of the ink jet nozzle. The inks are also required to be storage stable for long periods of time without deterioration in the properties of the ink.

We have found that mixtures of certain dyes are valuable as colorants for ink jet printing inks.

According to a first aspect of the present invention there is provided a composition comprising a black dye and a dye of Formula (A) or salt thereof:

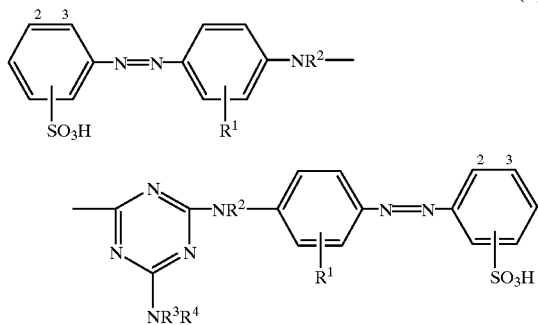

Formula (A)

wherein:

$R^1$ is $C_{1-4}$-alkoxy or $C_{1-4}$-alkyl;

$R^2$ is H or $C_{1-4}$-alkyl; and $R^3$ and $R^4$ are each independently H, $C_{1-4}$-alkyl or $C_{1-4}$-hydroxyalkyl;

wherein the black dye is selected from dyes of Formula (1), (2), (3), (4), (5), (6), (7) or (8) and salts thereof:

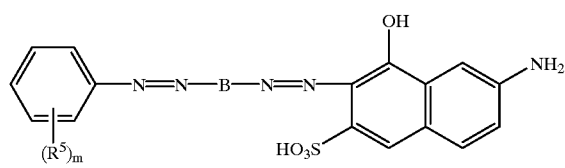

Formula (1)

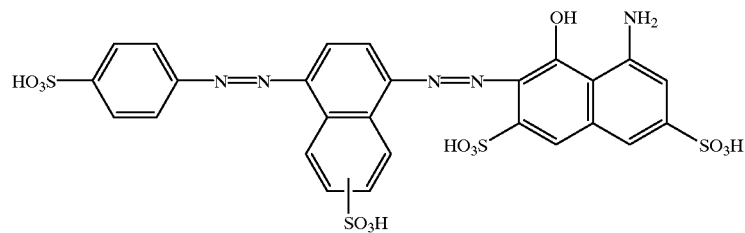

Formula (2)

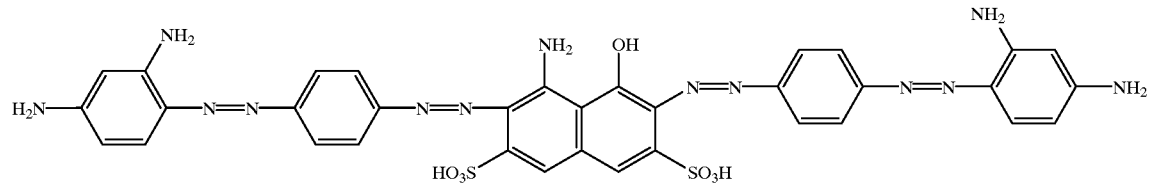

Formula (3)

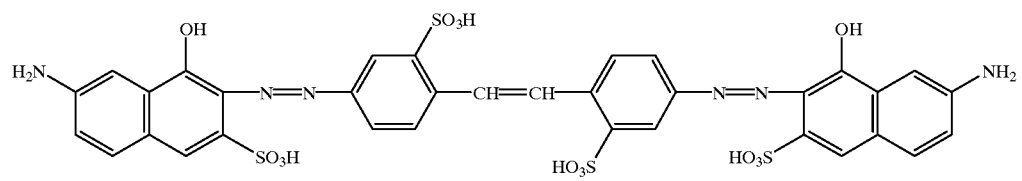

Formula (4)

Formula (5)

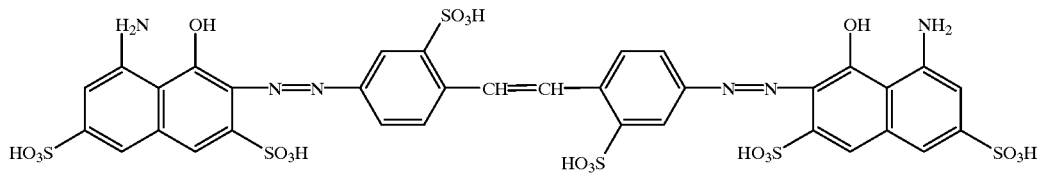

Formula (6)

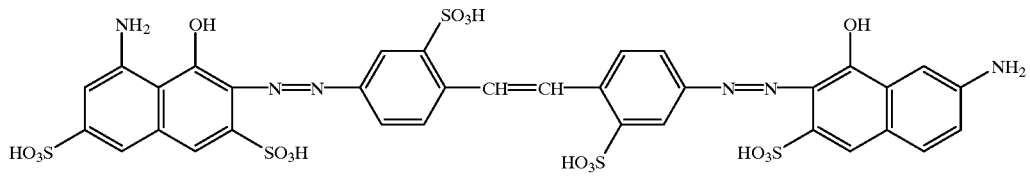

Formula (7)

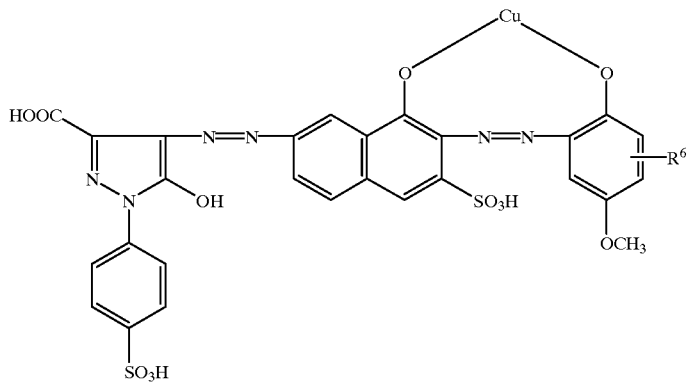

Formula (8)

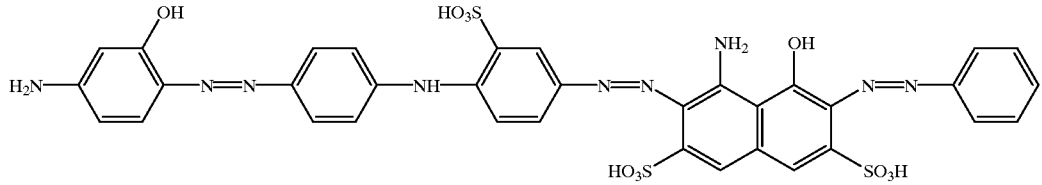

wherein $R^5$ is —COOH or —PO(OH)$_2$;

B is 1,4-phenylene carrying two groups selected from C$_{1-4}$-alkyl and C$_{1-4}$-alkoxy;

m is 1 or 2; and $R^6$ is vinyl sulphonyl, hydroxyethyl sulphonyl or a group which is convertible to vinyl sulphonyl when treated with aqueous alkali.

The —SO$_3$H group in the left hand phenyl group in Formula (A) is preferably at the 3-position.

$R^1$ is preferably meta to the azo group.

The group represented by $R^1$ is preferably methyl, ethyl, methoxy or ethoxy, especially methoxy.

The group represented by $R^2$ is preferably H or methyl, especially H. The group represented by $R^3$ and $R^4$ are preferably each independently H, methyl, ethyl or —CH$_2$CH$_2$OH. It is preferred that one of $R^3$ and $R^4$ is H and the other is —CH$_2$CH$_2$OH.

An especially preferred dye of the Formula (A) is of the formula below or a salt thereof:

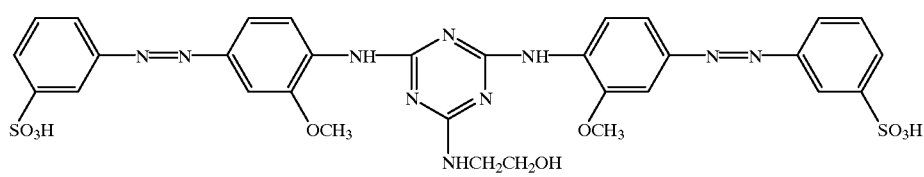

The above dye is available commercially as C.I.Direct Yellow 142.

The composition may contain a single dye selected from the dyes of Formulae (1) to (8), or a mixture of two or more of the dyes of Formulae (1) to (8).

The composition preferably comprises:
(a) from to 99 to 50 parts, more preferably 95 to 60 parts, especially 90 to 65 parts of one or more of the black dye(s); and
(b) from 1 to 50 parts, more preferably 5 to 40 parts, especially 10 to 35 parts of a dye of Formula (A);
wherein the parts are by weight and the sum of the parts (a) and (b)=100.

A preferred mixture of dyes of Formulae (1) to (8) comprises a mixture of two or three different dyes of Formula (1). Such mixtures are described in EP 761,771A and EP 771,860A.

A preferred black dye of Formula (1) is of the Formula (9) or a salt thereof:

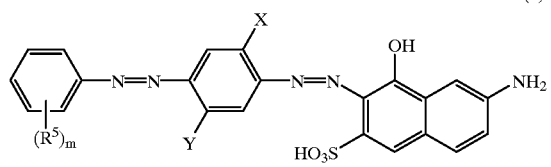

Formula (9)

wherein:
$R^5$ is as hereinbefore defined;
one of X and Y is $C_{1-4}$-alkoxy and the other is $C_{1-4}$-alkyl or $C_{1-4}$-alkoxy; and
m is 1 or 2.

When $R^6$ in the dye of Formula (7) is a group which is convertible to a vinyl sulphonyl group when treated with aqueous alkali it is preferably of the formula: —$SO_2CH_2CH_2OSO_3H$, —$SO_2CH_2CH_2SSO_3H$, —$SO_2CH_2CH_2Cl$ or —$SO_2CH_2CH_2OCOCH_3$. It is preferred that $R^6$ is —$SO_2CH_2CH_2OH$ or, more preferably, —$SO_2CH_2CH_2OSO_3H$. $R^6$ is preferably attached in the para position relative to the azo group in the dye of Formula (7).

Dyes of Formula (A) may be prepared by reacting an amine of formula $HNR^3R^4$ with a chlorotriazine analogue of the compound of Formula (A) in which there is a Cl atom in place of the —$NR^3R^4$ group. The chlorotriazine analogue may be prepared by condensing 2 moles of a compound of Formula (B) with one mole of cyanuric chloride:

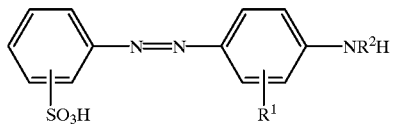

Formula (B)

The compounds of Formula (B) may be prepared by diazotising a sulphoaniline and coupling onto benzene carrying an $R^1$ and $NR^2H$ group.

Certain dyes of Formula (A) are commercially available, for example C.I. Direct Yellow 142.

The dyes of Formula (1) may be prepared using methods known in the art for the preparation of azo compounds. For example, suitable methods for the preparation of the dyes of Formula (1) are described in European patent applications No. EP 761,771A, EP 771,860A and EP 356 080A. The dyes of Formula (1) may be converted into the free acid form or into a salt with a counter ion other than sodium by using well known techniques. For example, the alkali metal salts of the dye of Formula (1) may be converted into a salt with ammonia or an amine by dissolving the dye in the form of a salt with an alkali metal, acidifying with a mineral acid and adjusting the pH of the solution to pH 9 to 9.5 with ammonia or the amine and removing the alkali metal cations by dialysis. An example of a suitable process for converting the sodium salt of the dye of Formula (1) to the ammonium salt is analogous to that described in Example 21 of EP 356, 080A.

The dye of Formula (2) is Food Black 2 and is commercially available from Bayer.

The dye of Formula (3) is commercially available from various manufacturers as C.I.Direct Black 19. The dye of Formula (3) may be prepared using conventional techniques for the preparation of azo dyes. For example a suitable method comprises:

(1) diazotising 1,4-phenylenediamine using, for example, sodium nitrite in a mineral acid at 0 to 5° C.;
(2) coupling 8-amino-1-naphthol-3,6-disulphonic acid with an approximately equimolar quantity of the diazotised 1,4-phenylene diamine from stage (1) under slightly acidic conditions;
(3) adjusting the pH of the solution resulting from stage (2) so that it is alkaline, preferably in the range pH 8 to 9, and adding a further equimolar quantity of diazotised 1,4-phenylenediamine from stage (1); and
(4) coupling the diazotised disazo dye formed in stage (3) with approximately 2 molar equivalents of 1,3-phenylenediamine to give the dye of Formula (3).

The dyes of Formulae (4) to (6) may be prepared using methods analogous to those used for the preparation of similar azo dyes. A suitable method comprises:

(1) diazotising 4,4'-diamino-stilbene-2,2'-disulphonic acid using, for example, sodium nitrite in a mineral acid at 0 to 5° C.; and
(2) coupling the diazonium salt from stage (1) with approximately 2 molar equivalents of a compound XH, preferably under mildly alkaline conditions. For the dye of formula (4) the compound XH is 2-amino-8-naphthol-6-sulphonic acid. For the dye of formula (5) the compound XH is 8-amino-1-naphthol-3,6-disulphonic acid. For the dye of Formula (6) the compound XH is an approximately equimolar mixture of 8-amino-1-naphthol-3,6-disulphonic acid and 2-amino-8-naphthol-6-sulphonic acid.

The dye of Formula (7) wherein $R^6$ is —$SO_2CH_2CH_2OSO_3H$, is commercially available from various manufacturers as C.I.Reactive Black 31. The dye of Formula (7) may be prepared using conventional methods for the preparation of azo dyes. For example, a suitable method comprises:

(1) diazotising 2-amino-8-naphthol-6-sulphonic acid and coupling the resultant diazonium salt with the pyrazolone compound of the formula:

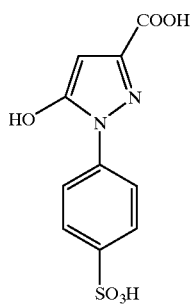

(2) diazotising the compound of the formula:

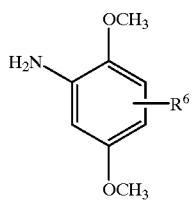

wherein $R^6$ is as hereinbefore defined;

(3) coupling the diazonium salt from stage (2) with the product of stage (1), preferably under alkaline conditions; and (4) heating the azo dye formed in stage (3) in the presence of cuprammonium sulphate and a suitable alkanolamine, such as dihydroxyethylamine, to give the dye of Formula (7).

When $R^6$ is hydroxyethylsulphonyl, it is preferred that the dye is prepared by hydrolysing a dye of the Formula (7) wherein $R^6$ is $—SO_2CH_2CH_2OSO_3H$.

The dye of Formula (8) is commercially available as C.I.Direct Black 168.

Dyes of the Formula (9) are described in EP 356 080A.

We have found that the addition of a cyan dye to a composition according to the first aspect of the present invention results in further improvements in print quality when the composition is incorporated into an ink. Accordingly, a second aspect of the present invention provides a composition comprising:
  (i) a composition according to the first aspect of the present invention; and
  (ii) a water-soluble cyan dye.

The water-soluble cyan dye is preferably a water-soluble phthalocyanine dye, more preferably C.I. Direct Blue 199, C.I. Acid Blue 9, C.I. Direct Blue 307 or C.I. Reactive Blue 71.

The composition according to the second aspect of the present invention preferably comprises:
  (i) up to 30, more preferably from 1 to 20 parts of one or more of the water-soluble cyan dye(s);
  (ii) from 0.5 to 30 parts, more preferably 1 to 20 parts of a dye of Formula (A); and
  (iii) from to 0.5 to 98 parts, more preferably 80 to 95 parts in total of one or more of the dyes according to Formulae (1), (2), (3), (4), (5), (6), (7) and (8);
wherein all parts are by weight and the sum of the parts (i)+(ii)+(iii)=100.

A preferred composition according to the second aspect of the present invention is where component (iii) is C.I.Direct Black 195 or C.I.Direct Black 168 (especially C.I.Direct Black 195), component (ii) is C.I.Direct Yellow 142 and component (i), is a cyan dye selected from C.I.Acid Blue 9, C.I.Direct Blue 199, C.I.Direct Blue 307, C.I.Reactive Blue 71 and C.I.Direct Blue 85.

The compositions according to the second aspect of the present invention are particularly useful when incorporated into inks for use in ink jet printers because they provide high quality prints with a good optical density and a particularly desirable neutral black shade.

The dyes present in the compositions according to the first and second aspects of the present invention may be in free acid form but are preferably in the form of water-soluble salt. Preferred salts are alkali metal salts, especially lithium, sodium and potassium salts or ammonium and substituted ammonium salts. Especially preferred salts are those formed with ammonia and volatile amines. The dyes may be converted to the desired salt form using conventional techniques. For example, the dye may be precipitated in its free acid form by adding an appropriate acid to an aqueous solution of the dye. The acid form of the dye may then be treated with a suitable base such as to yield the desired salt. Alternatively, ion exchange techniques can be used to convert the dyes to the desired salt forms.

The dyes in the compositions according to the first and second aspects of the present invention may be, and preferably are, purified to remove undesirable impurities before they are incorporated into inks for ink jet printing. Conventional techniques may be employed for purifying the dyes, for example ultrafiltration, reverse osmosis and/or dialysis.

According to a third aspect of the present invention there is provided an ink comprising:
  (i) 0.01 to 40 parts of a composition according to the first or second aspect of the present invention; and
  (ii) 99.99 to 60 parts a liquid medium or a low melting point solid medium; wherein all parts are by weight and the number of parts (i)+(ii)=100.

The number of parts of component (i) is preferably from 0.1 to 30, more preferably 1 to 25 and especially from 2 to 15.

It is preferred that when the medium is liquid, that the components present in the composition according to the first or second aspect of the present invention are dissolved completely in the medium to form a solution. Preferably the compositions have a solubility of 10% or more in the medium because this allows the preparation of concentrates which may be used to prepare more dilute inks and to minimise the chance of precipitation of colorant if evaporation of the liquid medium occurs during storage of the ink.

When the medium is a liquid it preferably comprises water, a mixture of water and one or more organic solvent(s), or an organic solvent.

When the medium comprises a mixture of water and one or more organic solvent(s), the weight ratio of water to organic solvent(s) is preferably from 99:1 to 1:99, more preferably from 99:1 to 50:50 and especially from 95:5 to 80:20.

It is preferred that the organic solvent(s) present in the mixture of water and organic solvent(s) are water-soluble organic solvent(s). Preferred water-soluble organic solvent(s) are selected from $C_{1-6}$-alkanols, for example methanol, ethanol, n-propanol, isopropanol, n-butanol, sec-butanol, tert-butanol, isobutanol and n-pentanol; cyclic alkanols, for example cyclohexanol and cyclopentanol; diols, preferably diols with 2 to 12 carbon atoms, for example pentane-1,5-diol; amides, for example dimethylformamide or dimethylacetamide; ketones or ketone-alcohols, for example acetone, methyl ether ketone, cyclohexanone and diacetone alcohol; ethers, for example tetrahydrofuran or dioxane; oligo- or poly-alkyleneglycols, for example diethylene glycol, trethylene glycol, hexylene glycol, polyethylene glycol and polypropylene glycol; alkyleneglycols or thioglycols containing a $C_{2-6}$-alkylene group, for example ethylene glycol, propylene glycol, butylene glycol, pentylene glycol hexylene glycol and thiodiglycol; polyols, for example glycerol, pentan-1,5-diol and 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy) ethoxy]-ethanol, 2-[2-(2-ethoxyethoxy)-ethoxy]-ethanol, 2-(2-butoxyethoxy)ethanol and ethyleneglycol-monoallylether; cyclic amides, for example 2-pyrrolidone, N-methyl-2-pyrrolidone, N-ethyl-2-pyrrolidone, caprolactam and 1,3-dimethylimidazolidone; cyclic esters, for example caprolactone; sulphoxides, for example dimethyl sulphoxide and sulpholane or mixtures containing two or more, especially from 2 to 8, of the aforementioned water-soluble organic solvents, for example thiodiglycol and a second glycol or diethylene glycol and 2-pyrrolidone.

Especially preferred water-soluble organic solvents are 2-pyrrolidone; N-methylpyrrolidone; alkylene- and oligo-alkylene-glycols, for example ethyleneglycol, diethyleneglycol, triethyleneglycol; and lower alkyl ethers of polyhydric alcohols, for example 2-methoxy-2-ethoxy-2-ethoxyethanol; and polyethyleneglycols with a molecular weight of up to 500.

A preferred mixture of water and water-soluble organic solvents comprises:

(a) from 60 to 80 parts water; and
(b) from 0.5 to 25 parts in total of one or more solvents selected from diethylene glycol 2-pyrrolidone, N-methylpyrrolidone, cyclohexanol, caprolcatone, caprolactam, pentane-1,5-diol, 2-(2-butoxyethoxy) ethanol and thiodiglycol;

wherein the parts are by weight and the sum of the parts (a) and (b)=100.

Examples of further suitable ink media comprising a mixture of water and one or more organic solvent(s) are given in U.S. Pat. Nos. 4,963,189, 4,703,113, 4,626,284 and EP 4,251,50A which are incorporated herein by reference thereto.

It is preferred to prepare the inks in a high purity form as is conventional for thermal ink jet printers. A combination of ultrafiltration, reverse osmosis and ion exchange may be used to render the total concentration of undesirable ions (e.g. halide, nitrite, nitrate, peroxide, divalent metal, trivalent metal and silicon) to less than 10 parts per million by weight relative to the weight of ink.

When the medium comprises an organic solvent it preferably has a boiling point of from 0 to 300° C., more preferably of from 50 to 200° C. The organic solvent may be water-immiscible or water-soluble. Preferred water-soluble organic solvents are any of the hereinbefore mentioned water-soluble organic solvents Preferred water-immiscible solvents include, for example, aliphatic hydrocarbons, esters, such as ethyl acetate, chlorinated hydrocarbons, such as $CH_2Cl_2$ and ethers, such as diethyl ether.

When the medium comprises a water-immiscible organic solvent a polar solvent such as an alcohol, ester, ether or amide is preferably added to enhance the solubility of the dyes in the medium. It is especially preferred that where the medium comprises an organic solvent, this is a ketones, especially methyl ethyl ketone or an alkanol especially ethanol and/or and n-propanol.

When the medium is/or contains organic solvent, it may comprise a single organic solvent or a mixture of two or more organic solvents. It is preferred that the medium comprises a mixture of 2 to 5 different organic solvents because this allows control to be exerted over the characteristics of the ink.

Inks in which the medium is wholly or mainly an organic solvent are used where fast drying times are required and particularly when printing onto hydrophobic and non absorbent substrates such as plastics, metal or glass.

When the medium for the ink comprises a low melting point solid, the melting point of the solid is preferably in the range from 60° C. to 125° C. Suitable low melting point solids include long chain fatty acids or alcohols, preferably those with $C_{18-24}$ chains and sulphonamides. The composition according to the first aspect of the present invention may be dissolved or finely dispersed in the low melting point solid.

The compositions according to the first and second aspects of the present invention are particularly useful as colorants for aqueous inks because they exhibit high solubility in water and aqueous media and have high humidity fastness on substrates, often surface treated papers, used for the preparation of photorealistic prints. Accordingly, it is preferred that the ink medium is water or, more preferably, a mixture of water and one or more water-soluble organic solvent(s).

The ink may contain other components conventionally used in ink jet printing inks, for example viscosity and surface tension modifiers, corrosion inhibitors, kogation reducing additives, and surfactants which may be ionic or non-ionic.

According to a fourth aspect of the present invention, there is provided a process for printing a substrate with an ink using an ink jet printer, characterised in that the ink is as defined for the third aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir having a small orifice by means of a resistor adjacent to the orifice, thereby causing the ink to be ejected through the orifice in the form of small droplets directed towards the substrate during relative movement between the substrate and the orifice.

The substrate used in the ink jet printing process is preferably paper, plastic, textile, metal or glass, more preferably paper, an overhead projector slide or a textile material, and especially paper.

Preferred papers are plain or treated papers which may have an acid, alkaline or neutral character.

According to a fifth aspect of the present invention, there is provided a paper an overhead projector slide or a textile material printed with an ink composition as hereinbefore defined for the third aspect of the present invention, or by means of the process according to the fourth aspect of the present invention.

A sixth feature of the present invention provides an ink jet printer cartridge, optionally refillable, containing an ink according to the third aspect of the present invention.

The invention is illustrated by the following examples.

EXAMPLES 1 to 15

Dye compositions may be prepared having the following ingredients and amounts shown in Table A. The amounts quoted in Table A refer to the number of parts by weight of each component. Dyes 1, 2, 3 and 4 are the ammonium salts of the dyes shown below.

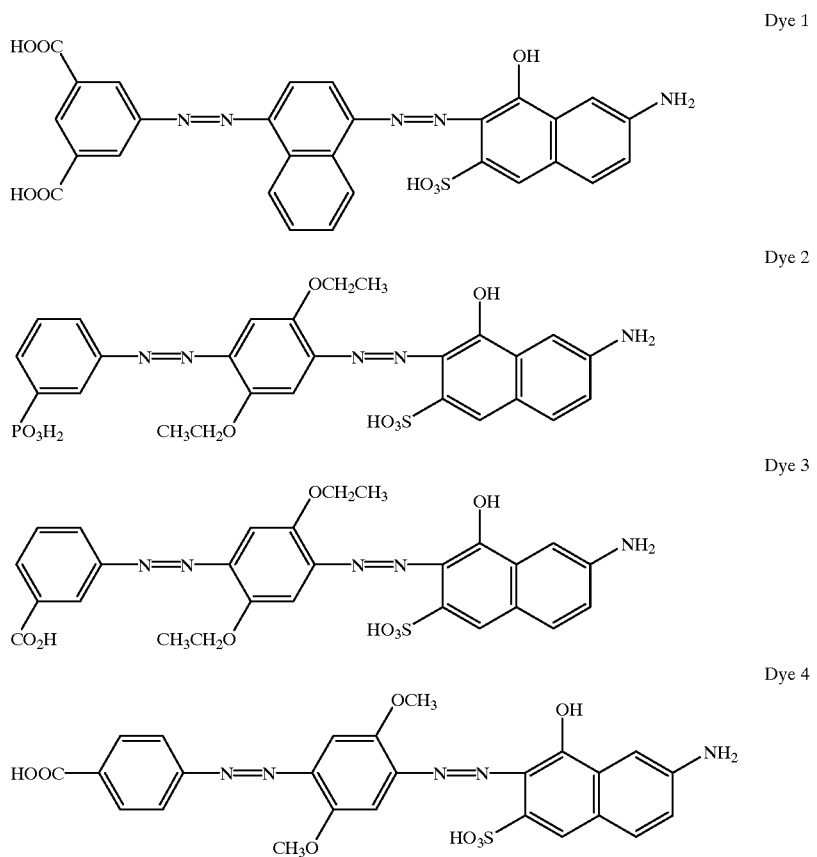

Dye 1

Dye 2

Dye 3

Dye 4

TABLE A

| Component | \multicolumn{15}{c}{Example No. (parts by weight given below)} |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| C.I. Direct Yellow 142 | 16.7 | 10 | 10 | 5 | | 25 | 20 | 10 | 12 | 16.7 | 12.4 | 16 | 24 | 16.7 | 10 |
| Dye of Formula (2) | | | | | | | | 85 | | | | | | | |
| Dye of Formula (3) | | | | | | | | | 84 | | | | | | |
| Dye of Formula (4) | | | | | | | | | | | | | | | 87 |
| Dye of Formula (5) | | | | | | | | | | | | | | 85 | |
| Dye of Formula (6) | | | | | | | | | | | | 76 | | | |
| Dye of Formula (7) | | | | | | | | | | | 81 | | | | |
| Dye of Formula (8) | | | | | | | | | | | | | 83.3 | | |
| Dye 1 | 80.3 | 80 | | | | 25 | 70 | | | | | | | | |
| Dye 2 | 3 | | | 45 | 47.5 | 25 | | | | | | | | | |
| Dye 3 | | | 45 | 47.5 | 25 | | | | | 84.1 | | | | | |
| Dye 4 | | | 10 | | | | 5 | | 83.3 | | | | | | |
| C.I. Direct Blue 199 | | | | | | | 5 | | | | 3.5 | 3 | | | |
| C.I. Direct Blue 307 | | | | | | | | 5 | | | | | | 5 | |
| C.I. Acid Blue 9 | | | | | | | | | 4 | | | | | | 3 |

TABLE B

| Component | \multicolumn{15}{c}{Example No. (parts by weight given below)} |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| C.I. Direct Yellow 142 | 5 | 10 | 25 | 15 | 4.5 | 12.4 | 14.5 | 9.4 | 27.5 | 14.3 | 10 | 4 | 6 | 13.8 | 30 |
| Dye of Formula (2) | | | | 40 | | | | 54.2 | | | | 31 | | | |
| Dye of Formula (3) | | 50 | | | | | 25 | | | 25 | | | | | |
| Dye of Formula (4) | | | | | 24.5 | | | | | | | | | | 20 |
| Dye of Formula (5) | | | | | 21 | | | | | | | | | | 20 |
| Dye of Formula (6) | | | | | 50 | | | | | | | | | | 30 |
| Dye of Formula (7) | | | 25 | | | | | | | | | | | 75 | |

TABLE B-continued

| Component | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Dye of Formula (8) | | | | | | | 42.4 | | 60 | | | | | | |
| Dye 1 | 85 | | 50 | 40 | | 42 | 55.5 | | | | | 60 | 15 | | |
| Dye 2 | | 40 | | | | | | | | 25 | 42.5 | | | | |
| Dye 3 | 5 | | | | | | | | | 25 | 42.5 | | | | |
| Dye 4 | | | | | | | | 26.4 | 10 | | | | | 86.2 | |
| C.I. Direct Blue 199 | 5 | | | | | 3.2 | | | | 10.7 | | 5 | | | |
| C.I. Direct Blue 307 | | | 5 | | | | 5 | | | | 5 | | 4 | | |
| C.I. Acid Blue 9 | | | | | | | | 10 | 2.5 | | | | | | |

TABLE C

| Component | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| C.I. Direct Yellow 142 | 7 | 9 | 4 | 10.2 | 9.1 | 2.5 | 10 | 15 | 4.6 | 10 | 1.5 | 9.5 | 20 | 31 | 3.8 |
| Dye of Formula (2) | 78 | | | | | | | | 31 | | | | | | 30 |
| Dye of Formula (3) | | | 55 | | | | | | | | | 45 | | | |
| Dye of Formula (4) | | | | | 20 | | | | | | | | | | |
| Dye of Formula (5) | | | | | 20 | | | | | | | | 80 | | |
| Dye of Formula (6) | | | | | 40 | | | | | | | | | 69 | |
| Dye of Formula (7) | | | | | | | | 80 | | | 98.5 | 45.5 | | | |
| Dye of Formula (8) | | | | 29.8 | | | | | | 40 | | | | | |
| Dye 1 | | 35 | | 65.9 | | | | | | | | | | | 62 |
| Dye 2 | | 31 | | | | | | | | 25 | | | | | |
| Dye 3 | | 20 | | | | | | | | 25 | | | | | |
| Dye 4 | | 87 | | | 25 | | 90 | | 62 | | | | | | |
| C.I. Direct Blue 199 | 15 | 4 | | | | | | | 5 | | | | | | 4.2 |
| C.I. Direct Blue 307 | | | | 5 | | | 17.5 | | | | | | | | |
| C.I. Acid Blue 9 | | | 10 | | | | | | 2.4 | | | | | | |

EXAMPLE 31

In place of C.I.Direct Yellow 142 in each of Examples 1 to 15 there may be used a dye having exactly the same formula except that (i) the sulpho groups are at the 4-positions instead of the 3-positions; or in place of methoxy groups there are ethoxy groups; or in place of an —NHCH$_2$CH$_2$OH group there is an —NHCH$_3$ group.

EXAMPLE 32

Inks 1 to 41 may be prepared having compositions described in Tables I and II wherein the second column identifies the relevant dye composition from the Examples in Table A. The third column shows the amount of dye composition in the ink. All amounts are parts by weight. Thus, by way of example, Ink 3 comprises:

(a) 3 parts of composition 2 in Table A (80 parts of Dye 1, 10 parts of Dye 4 and 10 parts C.I.Direct Yellow 142);
(b) 90 parts water;
(c) 5 parts diethylene glycol; and
(d) 5 parts N-methyl pyrollidone.

The following abbreviations are used in Table I and II:
PG=propylene glycol
DEG=Diethylene glycol
NMP=N-methyl pyrollidone
DMK=dimethylketone
IPA=isopropanol
MEOH=methanol
2P=2-pyrrolidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol The inks may be purified using standard UF, RO and ion exchange techniques to give very low (<5 p.p.m) concentrations of undesirable ions.

TABLE I

| Ink | Composition | Amount | Water | PG | DEG | NMP | DMK | NaOH | Na Stearate | IPA | MEOH | 2P | MIBK |
|---|---|---|---|---|---|---|---|---|---|---|---|---|---|
| 1 | 1 | 3 | 90 | | 5 | | | | | | | 5 | |
| 2 | 1 | 2.0 | 80 | 5 | | 6 | 4 | | | | | 5 | |
| 3 | 2 | 3.0 | 90 | | 5 | 5 | | 0.2 | | | | | |
| 4 | 3 | 10.0 | 85 | 3 | | 3 | 3 | | | | 5 | 1 | |
| 5 | 4 | 2.1 | 91 | | 8 | | | | | | | | 1 |
| 6 | 5 | 3.1 | 86 | 5 | | | | | 0.2 | 4 | | | 5 |

TABLE I-continued

| Ink | Composition | Amount | Water | PG | DEG | NMP | DMK | NaOH | Na Stearate | IPA | MEOH | 2P | MIBK |
|---|---|---|---|---|---|---|---|---|---|---|---|---|---|
| 7 | 6 | 1.1 | 81 | | | 9 | | 0.5 | 0.5 | | | 9 | |
| 8 | 7 | 2.5 | 60 | 4 | 15 | 3 | 3 | | | 6 | 10 | 5 | 4 |
| 9 | 8 | 5 | 65 | | 20 | | | | | 10 | | | |
| 10 | 9 | 2.4 | 75 | 5 | 4 | | 5 | | | | 6 | | 5 |
| 11 | 10 | 4.1 | 80 | 3 | 5 | 2 | 10 | | 0.3 | | | | |
| 12 | 12 | 3.2 | 65 | | 5 | 4 | 6 | | | 5 | 4 | 6 | 5 |
| 13 | 11 | 5.1 | 96 | | | | | | | | 4 | | |
| 14 | 3 | 10.8 | 90 | 5 | | | | | | 5 | | | |
| 15 | 5 | 10.0 | 80 | 2 | 6 | 2 | 5 | | | 1 | | 4 | |
| 16 | 7 | 1.8 | 80 | | 5 | | | | | | | 15 | |
| 17 | 9 | 2.6 | 84 | | | 11 | | | | | | 5 | |
| 18 | 2 | 3.3 | 80 | 2 | | | 10 | | | | 2 | | 6 |
| 19 | 1 | 12.0 | 90 | | | | 7 | 0.3 | | 3 | | | |
| 20 | 6 | 5.4 | 69 | 2 | 20 | 2 | 1 | | | | | 3 | 3 |
| 21 | 5 | 6.0 | 91 | | | 4 | | | | | | 5 | |

TABLE II

| Ink | Composition | Amount | Water | PG | DEG | NMP | CET | TBT | TOG | BDL | PHO | 2P | PI2 |
|---|---|---|---|---|---|---|---|---|---|---|---|---|---|
| 22 | 1 | 3.0 | 80 | 15 | | | 0.2 | | | | | 5 | |
| 23 | 2 | 9.0 | 90 | | 5 | | | | | | 1.2 | | 5 |
| 24 | 3 | 1.5 | 85 | 5 | 5 | | 0.15 | 5.0 | 0.2 | | | | |
| 25 | 4 | 2.5 | 90 | | 6 | 4 | | | | | 0.12 | | |
| 26 | 5 | 3.1 | 82 | 4 | 8 | | 0.3 | | | | | | 6 |
| 27 | 7 | 0.9 | 85 | | 10 | | | | | 5 | 0.2 | | |
| 28 | 9 | 8.0 | 90 | | 5 | 5 | | | 0.3 | | | | |
| 29 | 8 | 4.0 | 70 | | 10 | 4 | | | | 1 | | 4 | 11 |
| 30 | 12 | 2.2 | 75 | 4 | 10 | 3 | | | | 2 | | 6 | |
| 31 | 11 | 10.0 | 91 | | | 6 | | | | | | 3 | |
| 32 | 10 | 9.0 | 76 | | 9 | 7 | | 3.0 | | | 0.95 | 5 | |
| 33 | 5 | 5.0 | 78 | 5 | 11 | | | | | | | 6 | |
| 34 | 6 | 5.4 | 86 | | | 7 | | | | | | 7 | |
| 35 | 4 | 2.1 | 70 | 5 | 5 | 5 | 0.1 | 0.2 | 0.1 | 5 | 0.1 | 5 | |
| 36 | 8 | 2.0 | 90 | | | 10 | | | | | | | |
| 37 | 9 | 2 | 88 | | | | | | 10 | | | | |
| 38 | 2 | 5 | 78 | | | 5 | | | 12 | | | 5 | |
| 39 | 3 | 8 | 70 | 2 | | 8 | | | 15 | | | 5 | |
| 40 | 10 | 10 | 80 | | | | | | | 8 | | 12 | |
| 41 | 12 | 10 | 80 | | | 10 | | | | | | | |

What is claimed is:

1. A composition comprising a black dye and a dye of Formula (A) or salt thereof:

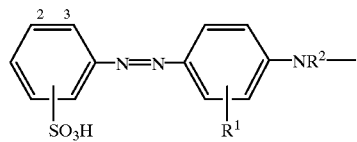

Formula (A)

wherein:

$R^1$ is $C_{1-4}$-alkoxy or $C_{1-4}$-alkyl;
$R^2$ is H or $C_{1-4}$-alkyl; and $R^3$ and $R^4$ are each independently H, $C_{1-4}$-alkyl or $C_{1-4}$-hydroxyalkyl;

wherein the black dye is selected from dyes of the Formula (3), (4), (5), (6) or (7) and salts thereof:

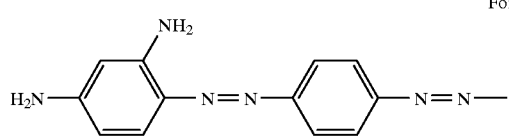

Formula (3)

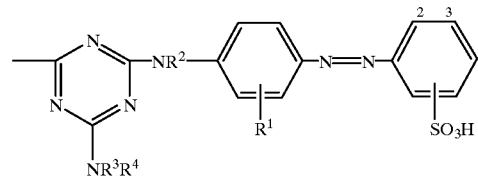

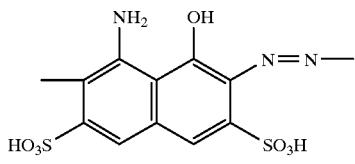

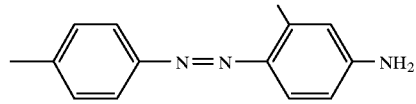

-continued

Formula (4)

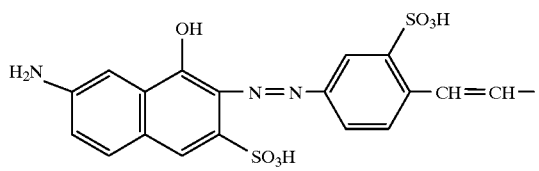

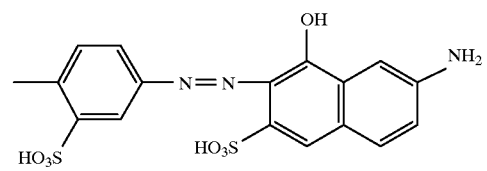

Formula (5)

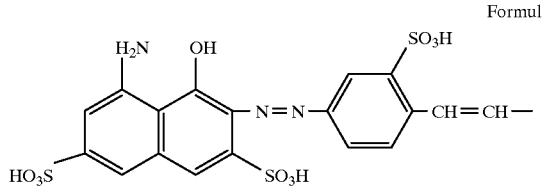

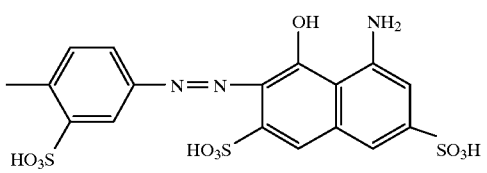

Formula (6)

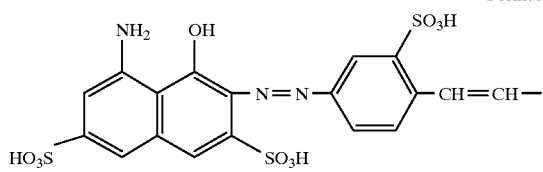

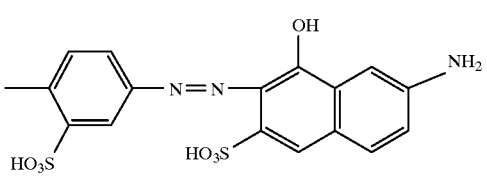

Formula (7)

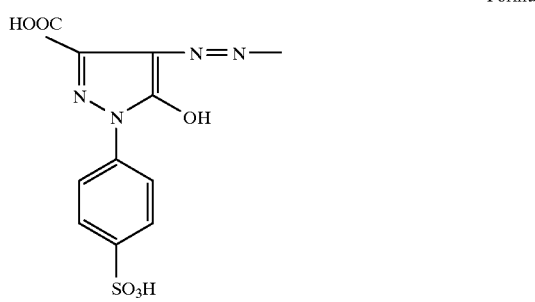

-continued

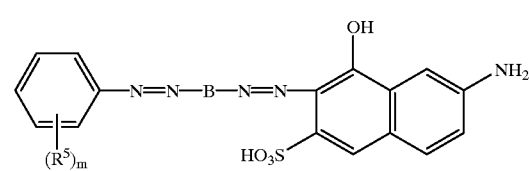

wherein:

B is 1,4-phenylene carrying two groups selected from the group consisting of $C_{1-4}$-alkyl and $C_{1-4}$-alkoxy;

m is 1 or 2; and $R^6$ is vinyl sulphonyl, hydroxyethyl sulphonyl or a group which is convertible to vinyl sulphonyl when treated with aqueous alkali.

2. A composition according to claim 1 comprising:
(a) from to 99 to 50 parts of one or more of the black dye(s); and
(b) from 1 to 50 parts of the dye of Formula (A);

wherein the parts are by weight and the sum of the parts (a) and (b)=100.

3. A composition comprising:
(i) a composition according to claim 1; and
(ii) a water-soluble cyan dye.

4. A composition according to claim 3 comprising:
(i) up to 30 parts of one or more of the water-soluble cyan dye(s);
(ii) from 0.5 to 30 parts of the dye of Formula (A); and
(iii) from 0.5 to 98 parts in total of one or more of the dyes according to Formulae (1), (3), (4), (5), (6) and (7);

Formula (1)

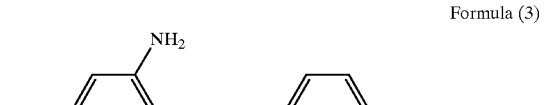

Formula (3)

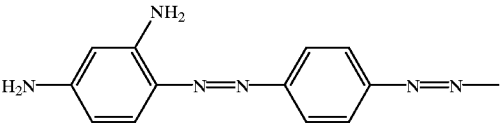

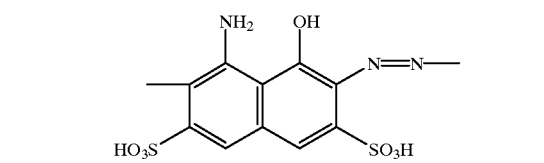

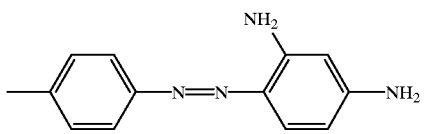
Formula (4)
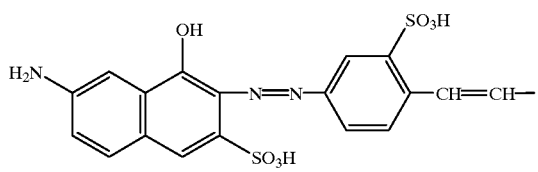
Formula (5)
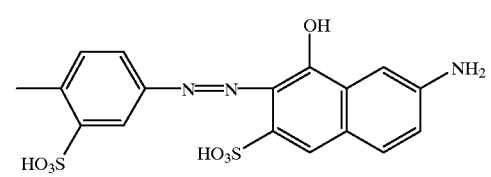
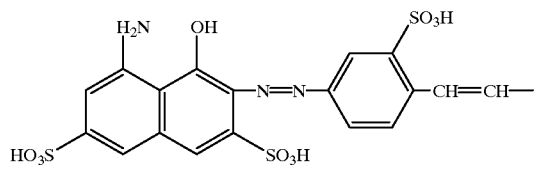
Formula (6)
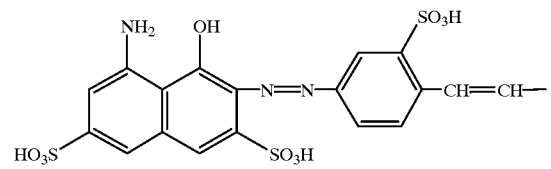
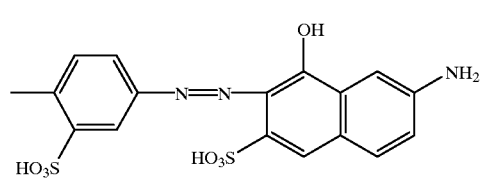
Formula (7)
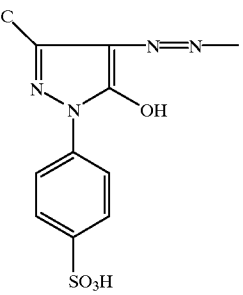
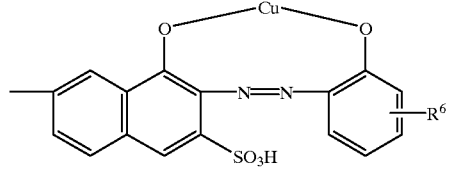
wherein all parts are by weight and the sum of the parts (i)+(ii)+(iii)=100.
5. A composition according to claim 3 comprising:
(i) up to 30 parts of one or more of the water-soluble cyan dye(s);
(ii) from 0.5 to 30 parts of the dye of Formula (A) or salt thereof:
Formula (A)

and (iii) from to 0.5 to 98 parts in total of one or more of the dyes according to Formulae (1), (3), (4), (5), (6) and (7);

Formula (1)

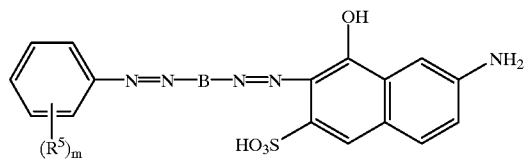

Formula (3)

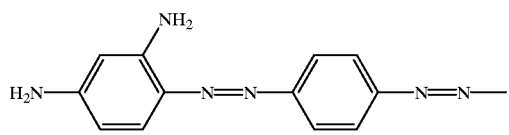

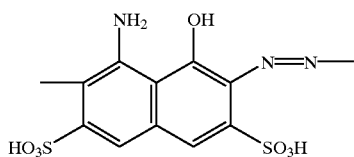

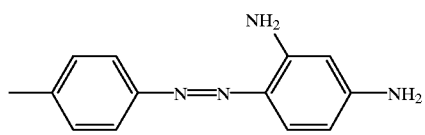

Formula (4)

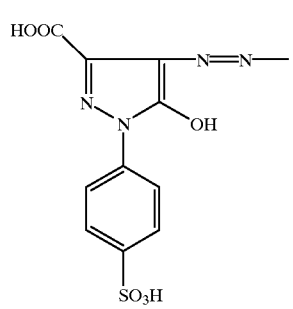

Formula (5)

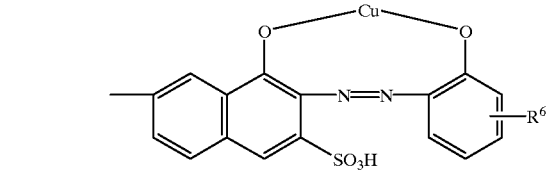

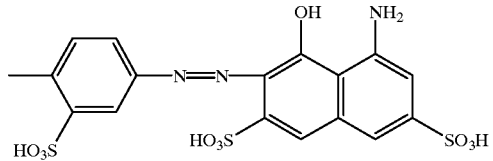

Formula (6)

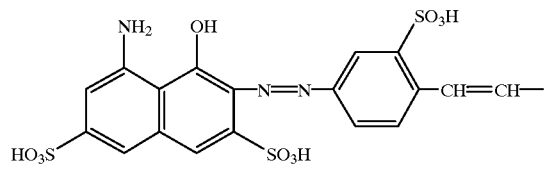

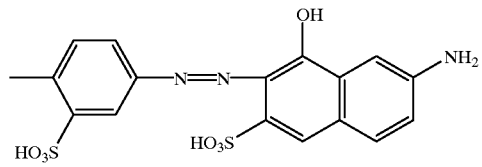

Formula (7)

wherein:

$R^5$ is –COOH or –PO(OH)$_2$;

B is 1,4-phenylene carrying two groups selected from the group consisting of $C_{1-4}$-alkyl and $C_{1-4}$-alkoxy;

m is 1 or 2; and $R^6$ is vinyl sulphonyl, hydroxyethyl sulphonyl or a group which is convertible to vinyl sulphonyl when treated with aqueous alkali:

wherein all parts are by weight and the sum of the parts (i)+(ii)+(iii)=100.

6. An ink comprising:

(i) 0.01 to 40 parts of a composition according to claim 1; and (ii) 99.99 to 60 parts a liquid medium or a low melting point solid medium;

wherein all parts are by weight and the number of parts (i) and (ii)=100.

7. An ink comprising:
   (i) 0.01 to 40 parts of a composition according to claim 1; and
   (ii) 99.99 to 60 parts a liquid medium or a low melting point solid medium;
   wherein all parts are by weight and the number of parts (i) and (ii)=100.

8. An ink comprising:
   (i) 0.01 to 40 parts of a composition according to claim 3; and
   (ii) 99.99 to 60 parts a liquid medium or a low melting point solid medium;
   wherein all parts are by weight and the number of parts (i) and (ii)=100.

9. An ink comprising:
   (i) 0.01 to 40 parts of a composition according to claim 2; and
   (ii) 99.99 to 60 parts a liquid medium or a low melting point solid medium;
   wherein all parts are by weight and the number of parts (i) and (ii)=100.

10. An ink according to claim 6, 7, 8 or 9 wherein the total concentration of undesirable ions is less than 10 parts per million by weight based on the total weight of ink.

11. A process for printing a substrate with an ink wherein an ink jet printer applies the ink to the substrate in the form of droplets which are ejected through a small orifice onto the substrate, wherein the ink is as defined in claim 6, 7, 8 or 9.

12. A process for printing a substrate with an ink wherein an ink jet printer applies the ink to the substrate in the form of droplets which are ejected through a small orifice onto the substrate, wherein the ink is as defined in claim 10.

13. A paper, an overhead projector slide, or a textile material printed with an ink composition as defined in claim 10.

14. An ink jet printer cartridge, optionally refillable, containing an ink according to claim 6, 7, 8 or 9.

15. A composition comprising a black dye and a dye of Formula (A) or salt thereof:

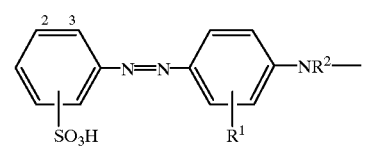

Formula (A)

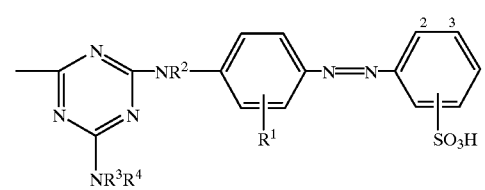

wherein:

R$^1$ is C$_{1-4}$-alkoxy or C$_{1-4}$-alkyl;

R$^2$ is H or C$_{1-4}$-alkyl; and

R$^3$ and R$^4$ are each independently H, C$_{1-4}$-alkyl or C$_{1-4}$-hydroxyalkyl;

wherein the black dye is selected from the group consisting of dyes of the Formula (4), (5), (6) or (7) and salts thereof:

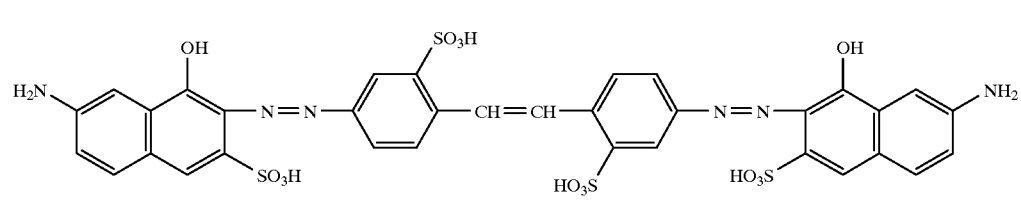

Formula (4)

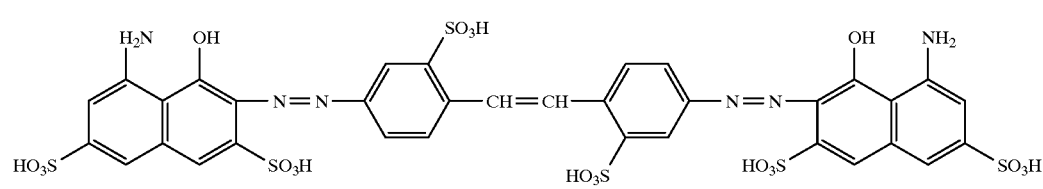

Formula (5)

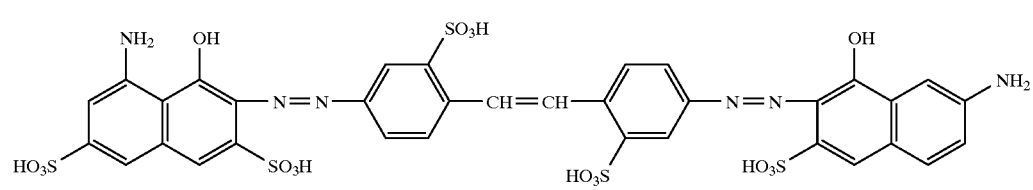

Formula (6)

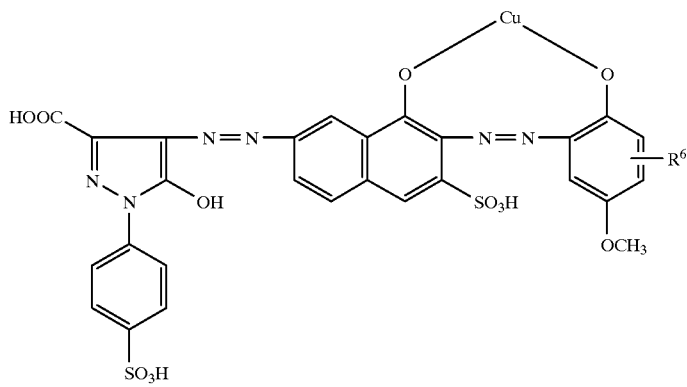

Formula (7)

wherein:

B is 1,4-phenylene carrying two groups selected from the group consisting of $C_{1-4}$-alkyl and $C_{1-4}$-alkoxy;

m is 1 or 2; and $R^6$ is vinyl sulphonyl, hydroxyethyl sulphonyl or a group which is convertible to vinyl sulphonyl when treated with aqueous alkali.

16. An ink comprising:
(i) 0.01 to 40 parts of a composition according to claim 15; and
(ii) 99.99 to 60 parts a liquid medium or a low melting point solid medium;
wherein all parts are by weight and the number of parts (i)+(ii)=100.

17. A composition comprising a black dye and a dye of Formula (A) or salt thereof:

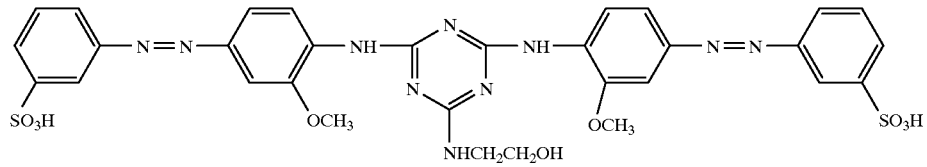

Formula (A)

wherein the black dye is selected from the group consisting of dyes of the Formula (1), (3), (4), (5), (6) or (7) and salts thereof:

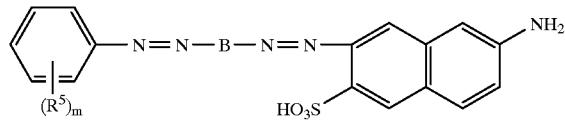

Formula (1)

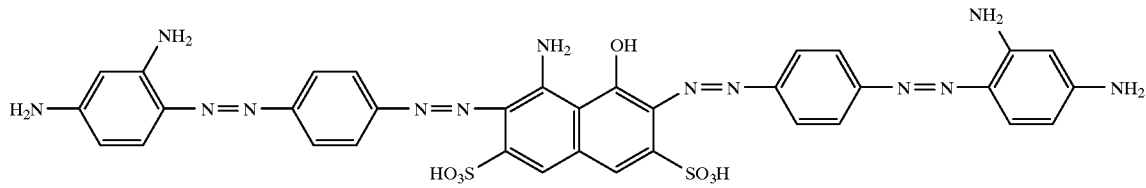

Formula (3)

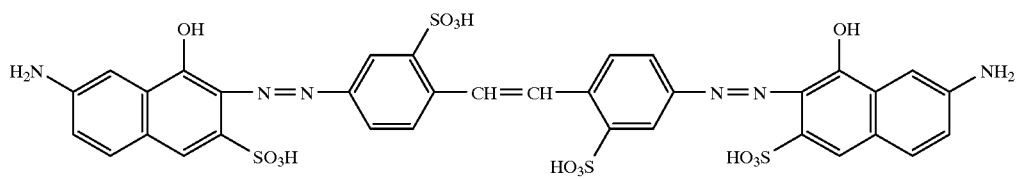

Formula (4)

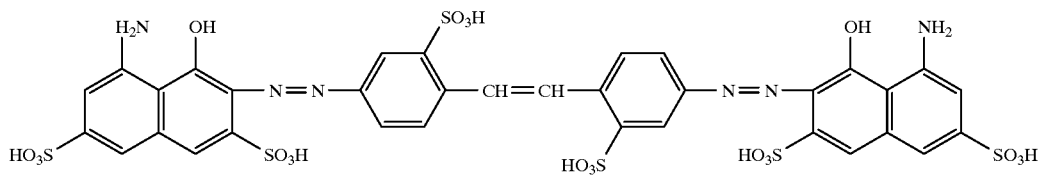

Formula (5)

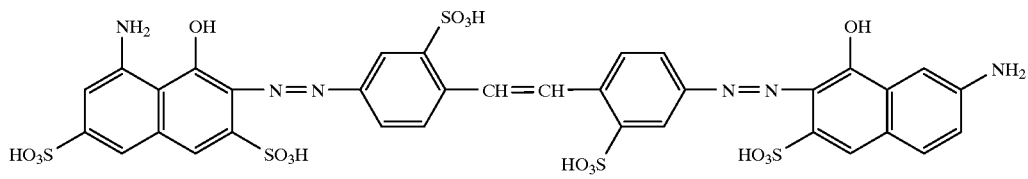

Formula (6)

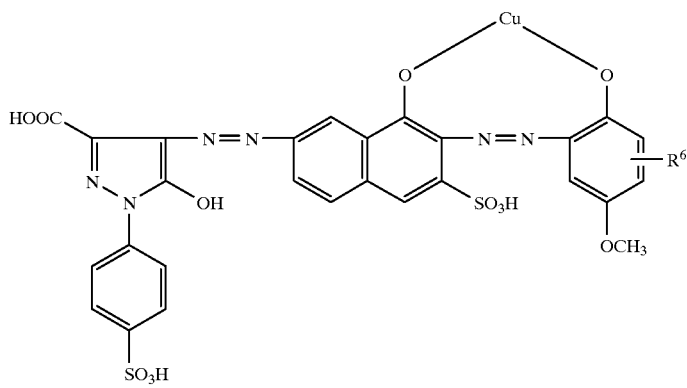

Formula (7)

wherein:

$R^5$ is —COOH or —PO(OH)$_2$;

B is 1,4-phenylene carrying two groups selected from the group consisting of $C_{1-4}$-alkyl and $C_{1-4}$-alkoxy;

m is 1 or 2; and $R^6$ is vinyl sulphonyl, hydroxyethyl sulphonyl or a group which is convertible to vinyl sulphonyl when treated with aqueous alkali.

18. A composition according to claim 17 wherein the black dye is of the Formula (9) or a salt thereof:

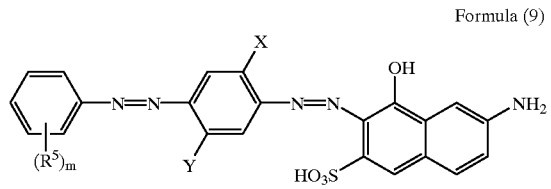

Formula (9)

wherein:

$R^5$ is as hereinbefore defined;

one of X and Y is $C_{1-4}$-alkoxy and the other is $C_{1-4}$-alkyl or $C_{1-4}$-alkoxy; and m is 1 or 2.

19. An ink comprising:

(i) 0.01 to 40 parts of a composition according to claim 17; and (ii) 99.99 to 60 parts a liquid medium or a low melting point solid medium;

wherein all parts are by weight and the number of parts (i)+(ii)=100.

20. An ink comprising:

(i) 0.01 to 40 parts of a composition according to claim 18; and (ii) 99.99 to 60 parts a liquid medium or a low melting point solid medium;

wherein all parts are by weight and the number of parts (i)+(ii)=100.

* * * * *